United States Patent [19]

Peperone

[11] Patent Number: 5,357,256
[45] Date of Patent: Oct. 18, 1994

[54] RADAR RECEIVER WITH ADAPTIVE CLUTTER THRESHOLD REFERENCE

[75] Inventor: Salvador J. Peperone, Columbia, Md.
[73] Assignee: AlliedSignal Inc., Morris Township, Morris County, N.J.
[21] Appl. No.: 108,201
[22] Filed: Aug. 17, 1993
[51] Int. Cl.⁵ ............................................ G01S 13/526
[52] U.S. Cl. .................................. 342/160; 342/162; 342/91
[58] Field of Search ................. 342/159, 160, 162, 90, 342/91, 93

[56] References Cited
U.S. PATENT DOCUMENTS

| | | | |
|---|---|---|---|
| 3,775,770 | 11/1973 | Dillard et al. | 342/160 X |
| 4,137,532 | 1/1979 | Taylor, Jr. et al. | 342/160 X |
| 4,308,535 | 12/1981 | Guillerot et al. | 342/194 |
| 4,839,655 | 6/1989 | Kiuchi | 342/93 |
| 4,965,585 | 10/1990 | Lepere et al. | 342/160 |
| 5,049,889 | 9/1991 | Hol et al. | 342/160 |

Primary Examiner—Gilberto Barron, Jr.
Attorney, Agent, or Firm—Howard G. Massung

[57] ABSTRACT

A method of detecting a target signal at a target signal level below the level of clutter in the return signals of a radar receiver. The receiver i.f. signals are correlated by multiplying delayed i.f. signals with undelayed i.f. signals. The correlated signals are filtered and then decomposed into their spectral component frequencies. The spectral components are compared, in turn, with individual thresholds. The individual thresholds are formed by summing the weighted values of selected ones of the spectral components, the selection being such that the spectral component being compared with a threshold is not used in forming that threshold. A target output signal is generated whenever any one of the spectral components exceeds the level of the threshold against which it is compared. In a second embodiment, in-phase and quadrature correlator signals are formed by the use of two correlators and two delay lines having different delay times that provide a 90 degree phase difference. The complex correlated signals are filtered, decomposed into spectral component frequencies and processed as in the first embodiment to generate a target output signal. In both embodiments, decomposition of the correlated signals may be carried out by means of a Discrete Fourier Transform.

8 Claims, 3 Drawing Sheets

RADAR RECEIVER WITH ADAPTIVE CLUTTER THRESHOLD REFERENCE

FIELD OF THE INVENTION

The resent invention relates to radar receivers. More particularly, it relates to a method for detecting moving target signals at target signal levels below the level of clutter in the return signals of a radar receiver.

BACKGROUND OF THE INVENTION

Prior radar receivers having moving target indicator (MTI) capability include some means for suppressing clutter present in the radar return signals so that a target return signal may be distinguished, either visually or automatically, from an obscuring background formed by clutter returns from the sea or ground surface and by system noise. One prior type of MTI receiver suppresses clutter by means that include a signal correlator. The correlator multiplies the radar receiver i.f. signal by the i.f. signal that has been passed through a delay line. The delay line provides a delay time comparable to, or somewhat less than, the duration of the transmitted pulse. The correlator output is filtered in a wide-band, band pass filter and the filtered output is compared with a fixed threshold or a slowly varying threshold in a comparator. The fixed threshold is set at a level estimated to be near the level of the filter output when clutter and noise alone compose the correlator input so that no output is generated by the comparator in the absence of a target signal. If a target signal is present in the correlator input, as well as clutter and noise, the filter output rises above the threshold and an output is generated by the comparator, signifying the presence of a target.

In the absence of a target signal, the clutter-x-delayed clutter product of the correlator contains low frequency components which are intended to be removed by the band pass filter. Since some clutter-x-delayed clutter and clutter-x-noise components pass through the filter, a variable threshold is often used to make adjustments for slow variations in clutter level. However, rapid variations in the clutter level, comparable to the variations associated with a target signal, are not accommodated by a slowly varying threshold, leading to false alarms.

Obviously, the ability of such a prior MTI receiver to detect targets in the presence of clutter and noise is dependent upon the accuracy with which the fixed or slowly varying threshold of the comparator duplicates the level of the filter output when the correlator input is composed solely of clutter and noise. Since the clutter level is subject to uncertain changes according to changes in the wind, sea state or terrain, the fixed or slowly varying threshold is likely to be set at too high a level, causing missed target detections, or too low a level, causing false alarms to be generated.

It is a principle object of the invention to provide an MTI radar target discriminator having improved sub-clutter visibility and immunity to false alarms.

Another object of the invention is to provide a target discriminator for an MTI radar in which the reference threshold is adaptively adjusted to correspond to rapid changes in the clutter level actually present, rather than against a fixed or slowly varying threshold.

It is a further object of the invention to provide a target discriminator for an MTI radar in which a target signal does not contribute to the adaptive reference threshold established from the clutter level actually present.

Other objects and advantages of the invention will become evident as a complete understanding thereof is gained from the following detailed description and the accompanying drawings.

BRIEF DESCRIPTION OF THE INVENTION

Briefly, the invention comprises an MTI radar receiver target discriminator in which the receiver i.f. signal is applied to a signal correlator similar to prior signal correlators. The correlator output is filtered in a wide-band, band pass filter and the filter output is applied to a filter bank containing a plurality of N contiguous narrow-band filters. Each filter output is detected and suitably filtered to provide a short-term average value thereof. The filter bank is followed by a plurality of individual comparators for comparing, in turn, the average value of the output of each narrow-band filter against a threshold composed of the sum of the weighted average values of the outputs of substantially all the other narrow band filters. In each of the comparators, the filter output being compared against a threshold is not used in forming that threshold. The outputs of the comparators are combined in an OR gate as the target discriminator output.

A second embodiment of the invention comprises two signal correlators, each of which multiplies the receiver i.f. signal by delayed i.f. signal. The second correlator differs from the first correlator in that the delay line associated with the second correlator is one-quarter wave length longer than the delay line associated with the first correlator. The output of the second correlator is passed through a 90° phase shifter to produce components in quadrature phase to the output components of the first correlator. The in-phase (I) output of the first correlator and the quadrature-phase (Q) output of the second correlator are processed through separate filter banks and comparators, similar to the filter bank and comparators of the single correlator embodiment of the invention, to provide target detection with increased sub-clutter visibility.

In the several embodiments of the invention, the filter bank for processing the correlator outputs is preferably implemented by means of a Discrete Fourier Transform (DFT).

DETAILED DESCRIPTION OF THE INVENTION

Figure 1:
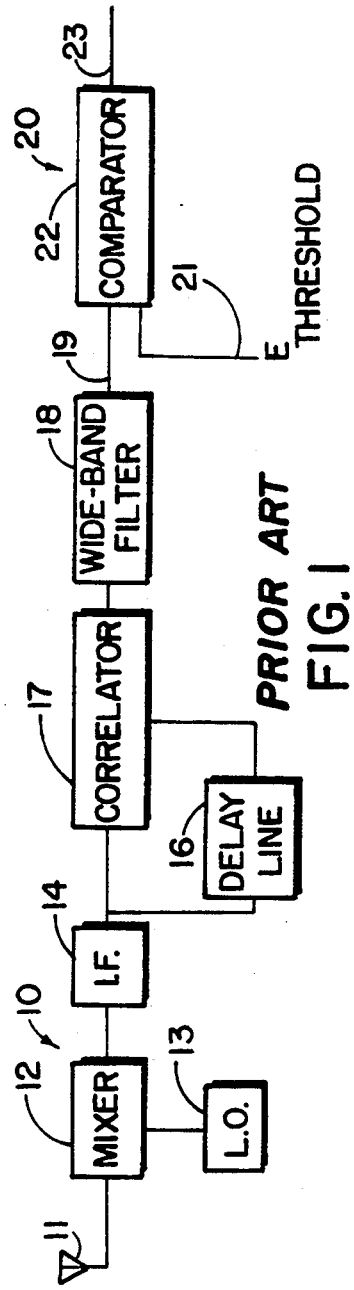
FIG. 1 is a functional block diagram of a prior art target discriminator for an MTI radar receiver.

FIG. 1 is a block diagram of an MTI radar receiver of the prior art. The radar is assumed to be a pulse-type radar. The receiver 10 includes an antenna 11, mixer 12, local oscillator 13, and i.f. amplifier 14. The output of i.f. amplifier 14 is applied to a delay line 16 and to a signal correlator 17, the output of which is filtered in a wideband, band pass filter 18. The correlator 17 multiplies the i.f. signal from amplifier 14 with the delayed i.f. signal from delay line 16 to produce a product which, in the absence of a target signal, is composed mainly of clutter-x-delayed clutter and clutter-x-noise components. The output of correlator 17 is band limited in a wide band, band pass filter 18 and the filter output 19 is applied to a target discriminator 20 comprising a comparator 22 having a fixed threshold input 21. The fixed threshold 21 is set at a level assumed to equal the level of filter output 19 when no target signal is present so that no output will be generated by the comparator 22 in the absence of a target signal. If a target signal is contained within the clutter and noise of the i.f. signal, the level of filter output 19 rises above the level threshold 21, causing comparator 22 to generate an output 23. Because the threshold 21 is either fixed at a level determined theoretically or experimentally to correspond to past clutter conditions, or the threshold 21 is varied according to slow changes in the clutter level, the threshold may be set at too high or too low a value under the clutter conditions encountered in actual use. Such inaccuracies in the threshold level setting can lead to missed target detections or to false alarms.

Figure 2:
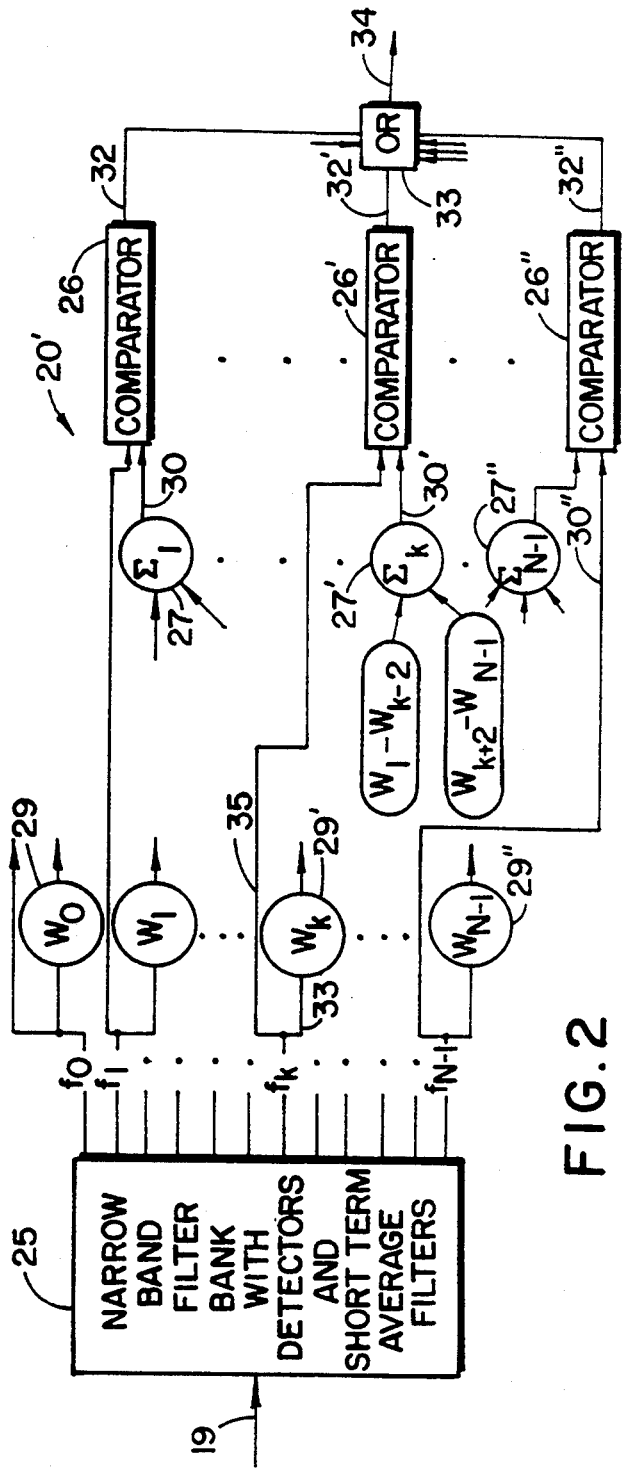
FIG. 2 is a functional block diagram of one embodiment of the invention as implemented in analog form.

Pursuant to the invention, the target discriminator 20 of FIG. 1 is replaced by a target discriminator 20' having thresholds that adaptively adjust to the clutter conditions actually existing at the time of use. FIG. 2 shows a block diagram of the invention implemented by analog means. Filter bank 25 includes a plurality n of narrow-band filters, the center frequencies of which are contiguously spaced to extend across the spectrum of the output 19 of wide-band filter 18 (FIG. 1). Filter bank 25 decomposes the output 19 into its constituent frequency components. Filter bank 25 also includes a plurality of detectors and short time constant low pass filters for producing the short-term average values $f_0$-$f_{N-1}$ of each of the frequency components. The $f_0$ component of the spectrum of output 19 is the lowest frequency term and the $f_{N-1}$ is the highest frequency term. The components $f_0$-$f_{N-1}$ are each compared, in turn, in separate ones of a plurality of (n−1) comparators 26-26" with individual adaptive thresholds 30-30". The outputs 32-32" of all comparators 26-26" are combined in an OR gate 33, generating a target output signal 34 upon the occurrence of an output from any of the comparators 26-26".

The adaptive thresholds 30-30" are formed individually by summing weighted values of particular ones of the $f_0$-$f_{N-1}$ components, as described below. This implementation enhances performance by using clutter-x-noise components, which extend from $f_0$ to $f_{N-1}$ provide dynamic enhancements of the thresholds.

The amplitude of each $f_0$-$f_{N-1}$ component is modified by a separate one of a plurality of weighting factors 29-29". The individual values of the weighting factors 29-29" may be uniform for each of the $f_0$-$f_{N-1}$ components or the weights may differ for different ones of the $f_0$-$f_{N-1}$ components. Different weighting factors may be used for the same frequency component when forming different thresholds. A plurality summing networks 27-27", one for each of comparators 26-26", add together selected ones of the weighted values of the $f_0$-$f_{N-1}$ components to produce the individual adaptive thresholds 30-30". The weighted value of the frequency component that is applied directly to a comparator is not used in making up the adaptive threshold for that comparator. In certain applications, the two frequency components adjacent to the frequency component being compared to a threshold are not used in forming that threshold.

For example, in the embodiment of the invention of FIG. 2, the $f_k$ output of filter bank 25 is applied through line 35 to comparator 26' and through line 33 to weighting factor 29'. The threshold 30' for comparator 26' is formed in summing network 27' by adding the weighted values ($W_1$ to $W_{k-2}$) and ($W_{k+2}$ to $W_{N-1}$) of the ($f_1$ to $f_{k-2}$) and the ($f_{k+2}$ to $f_{N-1}$) components. The $f_0$, $f_k$, $f_{k-1}$, and $f_{k+1}$ are not used as inputs to network 27'. Assuming that there are sixteen frequency components in all from filter bank 25, in this embodiment twelve components will be used in forming the threshold. The weighting factors are assigned a uniform value of $W = 1/12$ so that the output of network 29' constitutes the average of the inputs thereto. The thresholds for all the other comparators are formed in the same manner as for the kth comparator 26', with appropriate substitutions being made for the frequency components making up the thresholds. The low frequency response of the wide band filter may be selected to maintain an effective uniform weighting across the frequency components.

In other embodiments of the invention, the weighted values of the frequency components adjacent to the component being compared may be used in forming the comparison threshold and/or the weighting factors may be non-uniform. For example, the weighting factors for the lower frequency components may have smaller values than the weighting factors for the higher frequency components. In this case, the low corner frequency of the wide band filter would extend down to near d.c.

In further embodiments of the invention, the $f_0$ component may be applied to a comparator with suitable adjustments in the frequency response of the wide band filter and in the weighting values.

Figure 3:
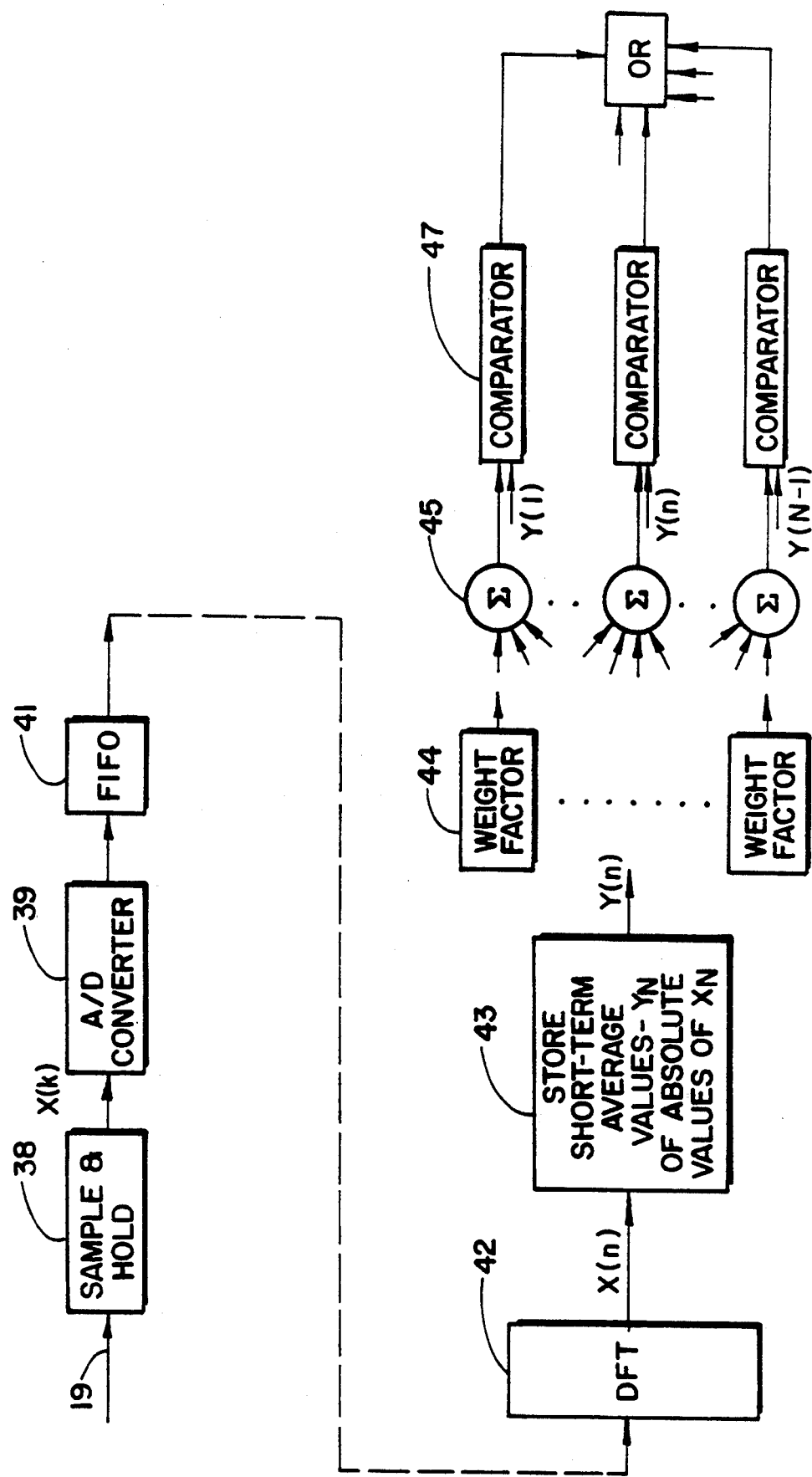
FIG. 3 is a functional block diagram of the target discriminator of the invention as implemented in digital form.
Figure 4A:
FIG. 4A is a waveform diagram showing the correlator output.
Figure 4B:
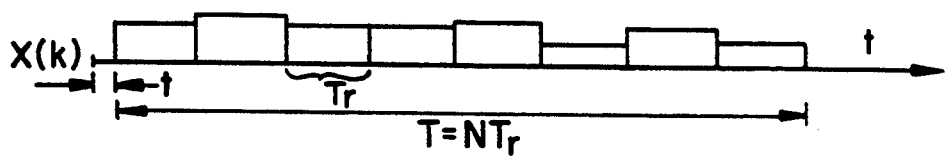
FIG. 4B is a waveform diagram showing samples of the correlator output taken by a sample and hold circuit.

FIG. 3 shows an embodiment of the invention using digital signal processing means to implement the target discriminator of FIG. 2. The output of the correlator 17 (FIG. 1) is applied to a sample and hold circuit 38 where one sample X(k) is taken from each of a succession of N pulses. Referring to FIG. 4A, the output of filter 19 consists of a series of pulses occurring at a repetition frequency $f_r = 1/T_r$. As seen in FIG. 4B, the samples X(k) taken by sample and hold circuit 38 are extracted at a fixed time $\tau$ after the beginning of each successive pulse 19. The samples X(k) from sample and hold 38 are converted to digital form by an A/D converter 39 and stored, suitably in a FIFO register 41.

The samples X(k) from register 41 are supplied to a Discrete Fourier Transform (DFT) signal processor 42 that performs a transform on N samples of X(k) according to the following algorithm:

$$X(n) = \sum_{k=0}^{N-1} X(k) e^{-j2\pi nk/N}$$

-continued $$n = 0, 1, \ldots N - 1$$

$$n = 0, 1, \ldots N - 1$$

Figure 4C:
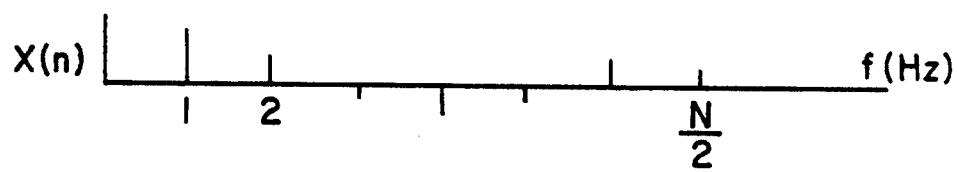
FIG. 4C is a diagram showing the spectral components typically produced by performing a Discrete Fourier Transform (DFT) upon the samples shown in FIG. 4B.

The X(n) outputs of DFT processor 41, of the form shown in FIG. 4C, are the components of the spectrum of the input 19, corresponding to the frequency components $f_0$-$f_{N-1}$ from filter bank 25 (FIG. 2). Certain of the X(n) outputs have negative values. The short term average values Y(n) of the absolute values of X(n) are stored at 43, weighted at 44, and summed at 45 for use as thresholds 46 in comparators 47. The thresholds 46 are formed in the same manner as the thresholds 30 of FIG. 2. For example, in an embodiment corresponding to the specific embodiment of FIG. 2, the Y(k) output is compared with a threshold composed of the sum of the weighted values of the [Y(1) to Y(k−2)] and [Y(k+2) to Y(N−1)] outputs. The DFT, absolute value, weighting, summing, and comparison operations of FIG. 3 may all be carried out by a single microprocessor. Alternatively, the DFT may be performed by a separate integrated circuit such as the ADSP-2101, available from Analog Devices, Inc.

Figure 5:
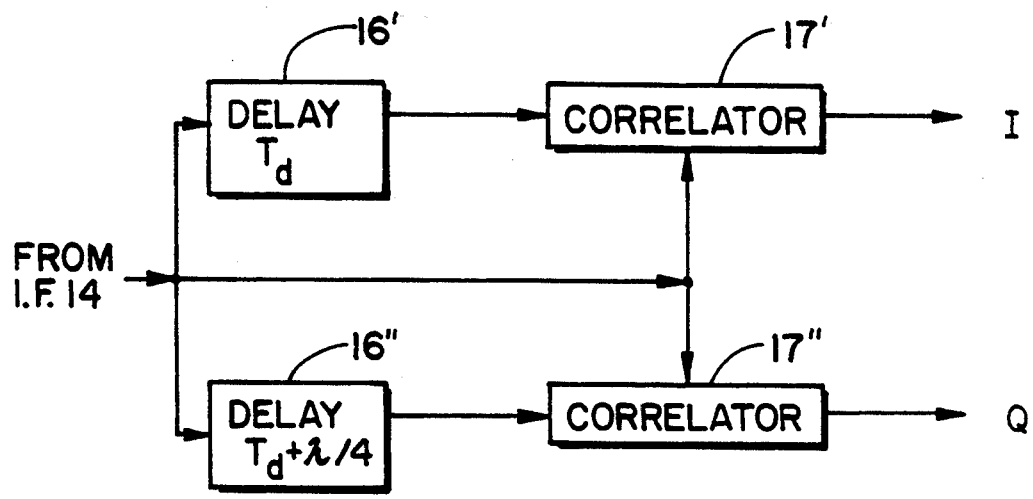
FIG. 5 is a functional block diagram of a signal correlator providing a complex signal input to the target discriminator of the invention.

In the embodiment of FIG. 3, the base band frequency components shown in FIG. 4C are unambiguous only up to one-half the pulse repetition rate $f_r$, i.e., from d.c. to $f_r/2$. FIG. 5 shows a variation in the signal correlator 17 of FIG. 1 that provides independent base band frequency components extending from d.c. to $f_r$, substantially doubling the number of independent components available to form the comparator thresholds, thereby enhancing performance.

Referring to FIG. 5, the i.f. signal from i.f. amplifier 14 is applied to a delay line 16' having a delay $T_d$ and to a correlator 17'. Correlator 17' combines the i.f. signal with the delayed i.f. signal from delay line 16' to produce an in-phase product I. The i.f. signal from amplifier 14 is also applied to a second delay line 16'' having a delay $T_d + \lambda/4$, where $\lambda/4$ is a delay corresponding to one-quarter wave length at the base band frequency, and to a second correlator 17''. The output of correlator 17'' provides a product Q that is in quadrature phase with the product I of correlator 17'. The I and Q products are filtered in separate wide-band filters similar to filter 18 (FIG. 1). The filtered I and Q signals are then sampled, digitized, and processed separately through a DFT and target discriminator similar to that shown in FIG. 3, except that the number of samples N taken and the number of spectral components X(n) generated by the DFT are doubled and the numbers of thresholds and comparators are correspondingly increased. Because a larger number of spectral samples are available the effectiveness of each variable threshold is enhanced.

Variations in the invention are possible in the light of the above teachings. The threshold of each of the comparators may be set at a multiple of the average of the frequency components making up the threshold, thereby reducing the probability of generating false alarms. In forming the thresholds, the lower frequency components of the clutter spectrum may be given less weight, tending to equalize the thresholds across the clutter frequency band. Still other variations in the invention may be made without departing from the spirit and scope of the appended claims.

The invention claimed is:

1. The method of detecting a moving target signal below the level of clutter in the intermediate frequency return signals of a radar receiver, comprising:
   delaying the intermediate frequency signals of said radar receiver;
   multiplying the delayed intermediate frequency signals with undelayed intermediate frequency signals from said radar receiver to provide correlated signals;
   decomposing said correlated signals into the spectral frequency components of said correlated signals;
   weighting said spectral frequency components;
   forming a plurality of individual thresholds from selected ones of said weighted spectral frequency components;
   individually comparing each of said spectral frequency components with an individual one of said thresholds, the selection of said weighted spectral frequency components to form each of said thresholds being such that the spectral frequency component being compared with a threshold is not used in forming that threshold; and
   detecting a target signal whenever any one of said spectral frequency components exceeds the threshold against which that spectral frequency component is being compared.

2. The method of claim 1 with the additional step of:
   filtering said correlated signals in a wide-band, band pass filter prior performing said step of decomposing said correlated signals.

3. The method of claim 2 wherein said step of decomposing said correlated signals comprises:
   applying said signals from said wide-band filter to a filter bank having a plurality of narrow-band filters, the center frequencies of said narrow-band filters being contiguously spaced across the frequency band of said wide-band filter;
   detecting and filtering the outputs of said narrow-band filters to provide the short-term average values of said narrow-band filter outputs, said short-term average values constituting said spectral frequency components.

4. The method of claim 2 wherein said signals from said wide-band filter are in analog form and wherein said step of decomposing said correlated signals comprises:
   sampling said signals from said wide-band filter to provide a sequence of samples;
   converting said samples of said sequence from analog to digital form; and
   performing a Discrete Fourier Transform upon said digitized sequence of samples to provide said spectral frequency components in digital form.

5. The method of claim 4 wherein said step of forming a plurality of individual thresholds comprises:
   obtaining the absolute values of said digital spectral frequency components provided by said step of performing a Discrete Fourier Transform;
   weighting said absolute values; and
   summing selected ones of said weighted absolute values of said digital spectral frequency components to provide each of said thresholds.

6. The method of detecting a moving target signal below the level of clutter in the intermediate frequency return signals of a radar receiver, comprising:
   delaying the intermediate frequency signals of said radar receiver for a first delay period;

multiplying the intermediate frequency signals delayed by said first period with undelayed intermediate frequency signals from said radar receiver to provide a first group of correlated signals;

delaying the intermediate frequency signals of said radar receiver by a second period, said second period differing from said first period;

multiplying the intermediate frequency signals delayed by said second period with undelayed intermediate frequency signals from said radar receiver to provide a second group of correlated signals;

shifting the phase of said second group of correlated signals by ninety degrees to provide quadrature correlated signals;

decomposing said first group of correlated signals and said quadrature correlated signals into the spectral frequency components thereof;

forming a plurality of individual thresholds from selected ones of said spectral frequency components;

individually comparing each of said spectral frequency components with an individual one of said thresholds, the selection of said spectral frequency components to form each of said thresholds being such that the spectral frequency component being compared with a threshold is not used in forming that threshold; and generating a target signal whenever any one of said spectral frequency components exceeds the threshold against which that spectral frequency component is being compared.

7. The method of claim 6 wherein said first group of correlated signals and said quadrature correlated signals are in analog form and wherein said step of decomposing said first group and said quadrature correlated signals comprises:

sampling said first group of correlated signals and said quadrature correlated signals to provide a sequence of samples;

converting said samples of said sequence from analog to digital form; and performing a Discrete Fourier Transform upon said digitized sequence of samples to provide said spectral frequency components in digital form.

8. The method of claim 7 wherein said step of forming a plurality of individual thresholds comprises:

obtaining the absolute values of said digital spectral frequency components provided by said step of performing a Discrete Fourier Transform;

weighting said absolute values of said spectral frequency components;

summing selected ones of said absolute values of said digital spectral frequency components to provide each of said thresholds.

* * * * *